Sept. 30, 1958 — O. MALFELD ET AL — 2,853,920
PROFILE PROJECTORS

Filed May 10, 1955 — 2 Sheets-Sheet 1

INVENTORS
Otto Malfeld
Helmut Becker
Walter Mandler
Artur Koch
Ernst Martin
by Benj. T. Rauber
their attorney Sept. 30, 1958     O. MALFELD ET AL     2,853,920
PROFILE PROJECTORS Filed May 10, 1955     2 Sheets-Sheet 2

2,853,920

PROFILE PROJECTORS

Otto Malfeld and Helmut Becker, Wetzlar, Walter Mandler, Atzbach, Kreis Wetzlar, Artur Koch, Wetzlar, and Ernst Martin, Steindorf, Germany, assignors to Ernst Leitz, G. m. b. H., Wetzlar, Germany, a corporation of Germany Application May 10, 1955, Serial No. 507,432

Claims priority, application Germany May 11, 1954

5 Claims. (Cl. 88—24)

Profile projectors are known having a mirror containing housing which is closed by a translucent projection screen beneath which an objective and an object table are arranged. In front of or to one side of said object table is provided an illuminating lamp with a condenser. This arrangement of lamp is not suited for top lighting, which is required commonly alone, or in combination with through lighting, and is also disadvantageous when the lamp stands between the observer and the object table and projection screen respectively.

Our invention relates to a more advantageous construction of a profile projector which involves manifold improvements as well as to the arrangement of elements and also to their construction.

The invention comprises a housing having a space extending rearwardly from the front end to form a lower leg, an upper leg and a rear opening to said legs and having a front wall at the rear of the space between said legs, said construction thus being of substantial U-shape and lying on the side of the U. This housing has a translucent projection screen in the front end of the upper leg. An object table is mounted on said lower leg in said space in position to receive light from an illuminating mirror in the lower leg and in which the rear chamber is divided by means of a heat insulating, preferably double walled, upwardly and rearwardly extending partition, into a rear ventilated illumination compartment and a front compartment. In the illumination compartment are mountings for lamps, one at the level of said space or top light and one at the level of the lower leg or through light illumination and in which the partition is pierced by the tube mountings of condensers for each lamp. This compartment of the housing containing the lamps is provided with ventilated openings while in the upper leg of the housing a mirror and an objective revolver are mounted in position to receive light from the object table.

A semi-transparent mirror for top lighting with its mounting tube is insertable in the tube mounting combined with the top light condenser and is thus removable out of the light path of the through light. Further a slide containing a color filter such as a monochromatic color filter, and an aperture plate with ring apertures can be slid in the tube of the bottom lamp at the position of the aperture diaphragm toward whose midpoint the lamp can be centered with the aid of a centering mounting. The object table is mounted in the space between the legs on an angle bracket adjustable in a vertical dove-tail, one side of which is spring loaded to avoid looseness or play. For horizontal adjustments at right angles the object table is provided with rack and pinion whose knobs are formed of flat discs only a portion of which project beyond the table edges. In this manner the form of the object table is made so flat that it can be mounted in the space between the two branches of the U-shaped housing.

An example of a projector illustrating an embodiment of the invention, by way of example, is shown in the accompanying drawings, in which Fig. 1 is a vertical, longitudinal section of the projector;

Figure 1:
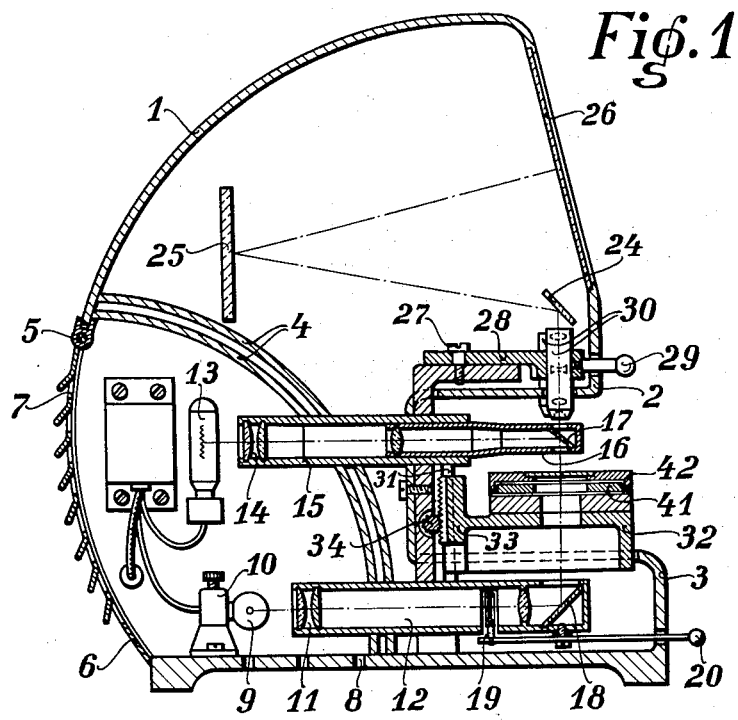
Figure 2:
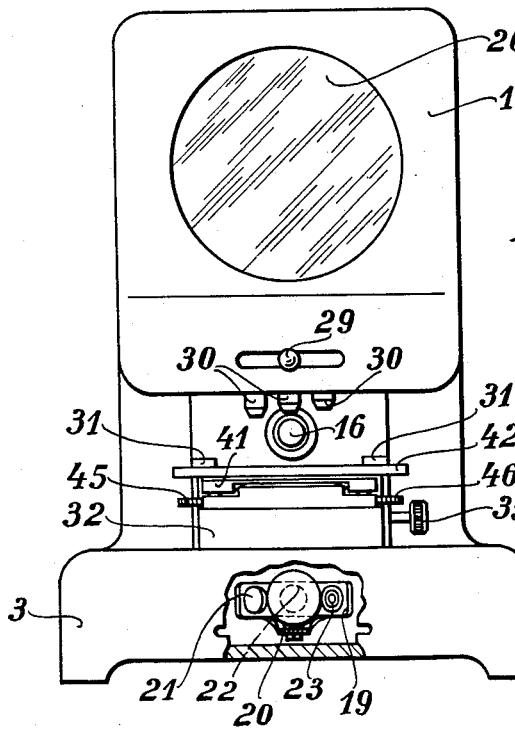
Fig. 2 is a front elevation.

Referring more particularly to Figs. 1 and 2, a U-shaped housing 1 is constructed with an upper leg 2 and a lower leg 3 to form a niche or recess between them. The housing is divided into a lower rear compartment by a partition 4 which is preferably double walled. The back part of this compartment is closed by means of a wall 6 hinged on a hinge 5 and is provided with ventilating slots 7. Ventilating holes 8 are provided in the floor of this compartment. Within the compartment a lamp 9 for through light illumination is mounted in a centering mounting 11. A condenser 10 associated with the lamp forms with its mounting tube 12 an airtight light passage through the wall 4. A second lamp 13 with a condenser 14 is in similar manner arranged for top light illumination. The tube 15 for conducting light from the condenser 14 through the wall 4 serves as a mounting guide for a tube 16 which carries at its forward end a semi-transparent mirror 17 of any suitable, usual, construction for top illumination and when not in use may be slid into the tube 15. In the tube 12 is a deflecting mirror 18 and at the position of the aperture diaphragm of a Kohler illuminating system is provided a slide 19 which is operable from the exterior by means of a handlle 20. As shown in Fig. 2 the slide has an opening 21, a color filter 22, and a plate 23 with concentric circles or annular light apertures, the function of which will be described later.

The Kohler system of illumination is described in The Principles of Optics, by Hardy and Perrin, McGraw-Hill Book Company, 1932, page 508. In this system of illumination the source is a ribbon-filament lamp. An enlarged image of the filament is formed on the diaphragm of the substage condenser by means of the collector lens, and the substage condenser in turn focuses an image of this lens on the specimen. These are the two lenses shown in the tube 12 of applicants' apparatus. With this arrangement, the diaphragm at the collector lens acts as the field stop of the illuminating system and the diaphragm at the substage condenser acts as the aperture stop. The former can therefore be closed down until only the region of the object to be photographed is illuminated, and the latter can be regulated until the objective is properly filled and the image appears most satisfactory.

The Kohler system of illumination is also mentioned in Phase Microscopy by Bennet et al., published by John Wiley & Sons, Inc., 1951, pages 107 and 295. As stated on page 295, in the Kohler illumination the coherent light from a point in the condenser diaphragm emerges from the substage condenser as a substantially plane wave which extends over the entire object plane and which subsequently forms in the image plane an "Abbe" picture of the entire field of view. This is in contrast with critical illumination in which the coherent light from a point in the source is focused in a highly localized manner upon a small portion of the object plane.

In the upper branch of the housing are two mirrors 24 and 25 and the projection receiving mat or ground glass plate 26. Also rotatably mounted on a pivot pin 27 is a rotator 28 for three objectives 30 movable by means of a handle 29.

Figure 3:
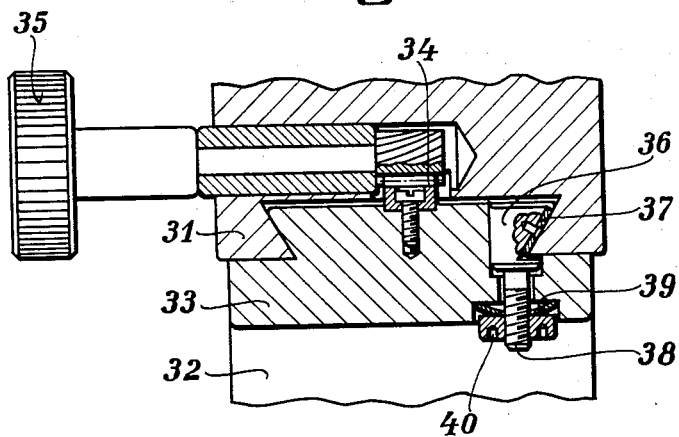
Fig. 3 is a horizontal section of the object table guide.

A rail 31 mounted vertically on the vertical front wall of the rear chamber of the housing and thus at the rear end of the rearwardly extending space, Fig. 1, provides a dove-tail guide for an object table 32. The object table has a vertical extension 33 dove-tailed at its rear face to engage slidably in the dove-tail guide of the rail 31 as shown in Fig. 3 and is provided with a rack which meshes with a pinion 34 journalled in the rail 31 and operated by a knob 35. One side of the dove-tail of the extension 33 is provided with a movable wedge 36 and a bearing plate 37 bearing against an adjacent side of the guide. A stud 38 extends forwardly from the wedge 36 through a bore in the extension 33 and is tensioned by a spring 39 and a nut 40 secured on the stud. Upon tightening the nut the spring draws the wedge 36, and with it the plate 37, tightly against the adjacent face of the dove-tail guide so that a guiding free from play is obtained.

Figure 4:
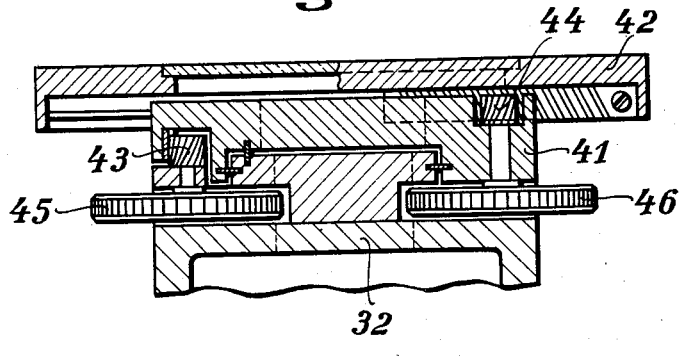
Fig. 4 is a vertical section through the object table.

As shown in Fig. 4 a cross sliding table is supported on the object table 32 and comprises two parts 41 and 42 in superposed position, one movable in one direction and the other in a direction at a right angle thereto. Adjusting knobs 45 and 46 for these movements are formed as flat discs which project only to a slight extent beyond the edges of the table. This construction makes possible a small construction height so that the slight space between the two branches of the U-shaped housing may be used for the adjustment of the table.

The above mentioned centering arrangement of the lamps has the advantage that commercial lamps can be used instead of the otherwise customary specially centered projection lamps. Upon mounting the lamp in the centerable mounting the projection screen is removed and the exit pupil of the objective appears sharply imaged in the aperture diaphragm. If now any opening of the slide 19 is slid into position which is provided with the above-mentioned circles the lamp can be so centered that its illuminating surface appears in the center of the circle.

Having described our invention, what we claim is:

1. A profile projector for through and top lighting which comprises a housing having a recess extending from the front end to form a lower leg, an upper leg and a rear chamber opening to said legs and having a front wall at the rear of the recess between said legs, said upper leg having a translucent projection screen in its front end, an object table with an opening in said recess, a heat insulating partition extending upwardly in said rear chamber to separate said chamber into a rear, ventilated, illumination compartment and a front compartment, mountings for upper and lower lamps in said rear compartment, upper and lower light condensers, the lower condenser having a mounting tube adjustably extending through said partition from said rear compartment into said lower leg and having a reflector below said object table to reflect light upwardly through the opening in said object table, and the upper condenser having a mounting tube extending through said partition and said front wall above said object table and having a reflector to reflect light downwardly to said object table, said condensers being arranged in a Köhler system of illumination, reflecting mirrors mounted in the upper leg in position to reflect light projected from or through said object table to the translucent projection screen and an adjustable element carrying a plurality of objectives in a wall between said upper leg and said recess and means to shift each of said objectives in succession into the path of light.

2. The projector of claim 1 in which the reflector of said upper condenser is a transparent mirror and in which a part of said condenser tube is slidably mounted so that it may be slid out of the path of light passing upwardly through the opening of said object table.

3. The projector of claim 1 in which the mountings for said lamps are centering mountings, and in which at least one of said condenser mountings has a slide movable to carry a monochromatic color screen, an opening and an annular light aperture alternatively into the path of light passing through said condenser.

4. The projector of claim 1 comprising a vertical extension on the object table having a dove-tail, a vertical dove-tail guide in the space between said upper and lower legs of said housing to receive slidably the dove-tail of the object table and means for resiliently loading said dove-tail in said guide.

5. The projector of claim 1 in which said object table comprises a pair of tables in superposed position and guided for movements in directions at right angles, rack and pinion drives for said tables and disc-shaped actuating knobs for said drives within and projecting slightly from said table assembly.

References Cited in the file of this patent

UNITED STATES PATENTS

| 1,424,941 | Rirwitz | Aug. 8, 1922 |
| 1,894,004 | Rose | Jan. 10, 1933 |
| 2,146,506 | Maisch | Feb. 7, 1939 |
| 2,226,618 | Kuppenbender | Dec. 31, 1940 |
| 2,230,573 | Mestre | Feb. 4, 1941 |
| 2,313,639 | Hauser | Mar. 9, 1943 |
| 2,391,999 | Portman | Jan. 1, 1946 |
| 2,406,451 | Borkenstein | Aug. 27, 1946 |
| 2,552,280 | Hudak | May 8, 1951 |
| 2,681,592 | Heine | June 22, 1954 |

FOREIGN PATENTS

| 332,017 | Great Britain | July 17, 1930 |
| 437,583 | Great Britain | Oct. 31, 1935 |
| 779,608 | France | Jan. 19, 1935 |